United States Patent
Brandl et al.

(12)

(10) Patent No.: US 6,431,133 B2
(45) Date of Patent: Aug. 13, 2002

(54) CHAIN DRIVE OF A V-ENGINE HAVING OVERHEAD CAMSHAFTS

(75) Inventors: Rudolf Brandl, Munich; Leonhard Halmanseger, Kolbermoor, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/731,652

(22) Filed: Dec. 8, 2000

(30) Foreign Application Priority Data

Dec. 10, 1999 (DE) .......................... 199 59 594

(51) Int. Cl.[7] ................................. F01L 1/02
(52) U.S. Cl. ..................... 123/90.31; 474/110; 474/111
(58) Field of Search .................. 123/90.31; 474/110, 474/111, 133, 140

(56) References Cited

U.S. PATENT DOCUMENTS

| 4,553,509 A | | 11/1985 | Mezger et al. ............. 123/90.27 |
| 5,063,895 A | | 11/1991 | Ampferer ................. 123/196 R |
| 5,207,620 A | * | 5/1993 | Yamamoto ................... 474/135 |
| 5,653,653 A | * | 8/1997 | Ledvina ...................... 474/110 |
| 5,720,684 A | * | 2/1998 | Mott .......................... 474/110 |
| 6,106,423 A | * | 8/2000 | White ......................... 474/109 |

FOREIGN PATENT DOCUMENTS

| DE | 33 26 319 | 1/1985 |
| DE | 39 21 715 | 1/1991 |
| DE | 40 35 823 | 12/1991 |
| DE | 42 06 071 | 1/1993 |

* cited by examiner

Primary Examiner—Thomas Denion
Assistant Examiner—Jaime Corrigan
(74) Attorney, Agent, or Firm—Crowell & Moring LLP

(57) ABSTRACT

A chain drive of a V-engine with overhead camshafts includes chains which are driven by a crankshaft. In each case the overhead cam shafts are driven by a separate chain. Tensioner blades swivellably assigned to a respective slack run of the chains are acted upon by hydraulic chain tensioners of the same type of construction. The chain tensioners are arranged in an accessible manner on the exterior side on the V-engine and interact with sloped contact ramps on the tensioner blades. The chain tensioners of the same construction are arranged transversely to one another on the V-engine and are configured for a reliable venting in each installed position by including two mutually independently operating leakage devices.

7 Claims, 2 Drawing Sheets

CHAIN DRIVE OF A V-ENGINE HAVING OVERHEAD CAMSHAFTS

BACKGROUND AND SUMMARY OF THE INVENTION

This application claims the priority of German Patent Document 199 59 594.1, filed Dec. 10, 1999, the disclosure of which is expressly incorporated by reference herein.

This invention relates to a chain drive of a V-engine having overhead camshafts which are driven by a crankshaft, in each case, by a separate chain, in which case tensioner blades swivellably assigned to a respective slack run of the chains are acted upon by hydraulic chain tensioners of the same type of construction.

A chain drive of this type for a V-engine is known, for example, from German Patent Document DE 39 21 775 A1. The tensioner blades acting upon the respective slack run of the respective chain are in each case acted upon by chain tensioners which are arranged between the slack run and the tension run of the respective chain on the respective face of a pertaining face of a pertaining cylinder bank and of the pertaining cylinder head. These chain tensioners, which, because of their arrangement, have the same construction, are therefore not easily accessible if required.

It is an object of the invention to provide, for a chain drive of the above-mentioned type having chain tensioners accessible from the outside, an arrangement therefor as well as a further development for chain tensioners of the same construction on V-engines.

This object is achieved by the tensioner blades having in their free end areas contact ramps for spherically designed end sections on tensioning pistons of the chain tensioners of the same construction, which contact ramps are arranged in a sloped manner such that the first chain tensioner is arranged in the area of an inlet-side longitudinal side of a first cylinder head and the second chain tensioner is arranged in the area of an outlet-side longitudinal side of a second cylinder head, wherein the chain tensioners which are arranged with respect to one another essentially in a transverse direction with a vertically aligned to vertically sloped first chain tensioner and a horizontally aligned to horizontally sloped second chain tensioner in each case are equipped with leakage devices used for different venting directions, in both end areas of each tensioning piston.

By the design according to the invention of the tensioner blades with contact ramps arranged in a sloped manner and known per se from German Patent Document DE 42 06 071 C2, for spherically designed end sections of the tensioning pistons, the chain tensioners can be arranged in an advantageous manner to be accessible from the outside or mountable relative to the housing of the respective V-engine. According to an advantageous feature of preferred embodiments of the invention, the chain tensioners are arranged with respect to one another in a transverse direction and each of the chain tensioners of the same construction has two mutually independently operating leakage devices, for the advantageous venting of the chain tensioners in the respective installed position.

Advantageous features of preferred embodiments of the invention are described in the claims.

The invention will be described by an embodiment illustrated in the drawing.

Other objects, advantages and novel features of the present invention will become apparent from the following detailed description of the invention when considered in conjunction with the accompanying drawings.

DETAILED DESCRIPTION OF THE DRAWINGS

Figure 1:
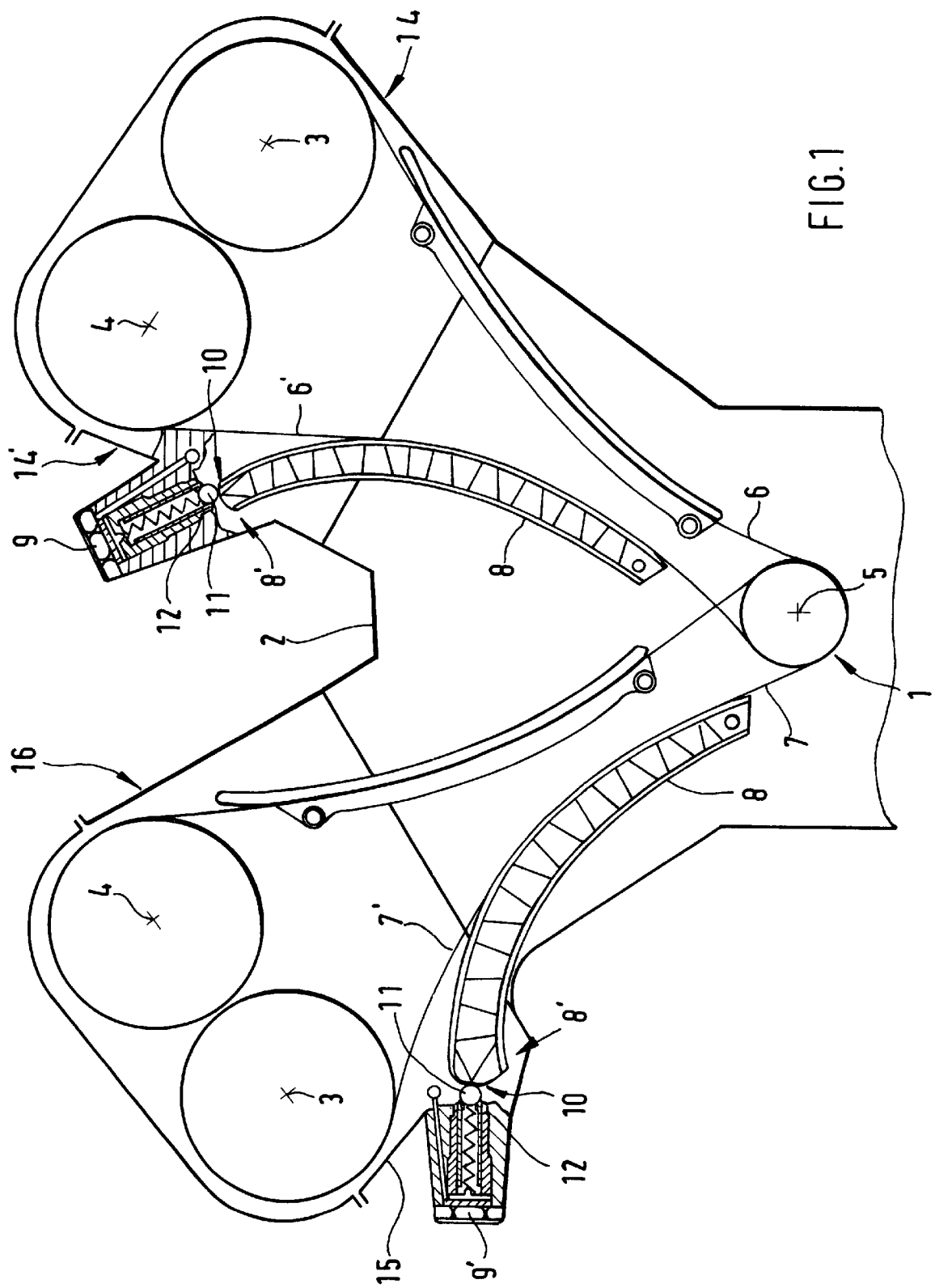
FIG. 1 is a part sectional schematic view of chain drives for overhead camshafts of a V-engine illustrated in a front view with chain tensioner assemblies and preferred embodiments constructed according to the present invention with chain tensioner.

In the case of a chain drive 1, as shown in FIG. 1, of a V-engine 2 with overhead camshafts 3, 4, these camshafts are driven by a crankshaft 5 in each case by a separate chain 6, 7, in which case tensioner blades 8 swivellably assigned to a respective slack run 6', 7' of the chains 6, 7 are acted upon by hydraulic chain tensioners 9, 9' of the same type of construction.

According to the invention, the tensioner blades 8 have in their free end areas 8' contact ramps 10 for spherically designed end sections 11 on tensioning pistons 12 of the chain tensioners 9, 9'. The contact ramps 10 are arranged in a sloped manner and such that the first chain tensioner 9 is arranged in the area of an inlet-side longitudinal side 14' of a first cylinder head 14 of the V-engine 2, and the second chain tensioner 9' is arranged in the area of an outlet-side longitudinal side 15 of a second cylinder head 16 of the V-engine 2. Further, for the ideal venting of the hydraulic system of the chain tensioners 9, 9', it is provided according to the invention that the chain tensioners 9, 9' are arranged with respect to one another essentially in a transverse direction. A vertically sloped first chain tensioner 9 and a horizontally sloped second chain tensioner 9' are equipped with leakage devices 17, 18 used for different venting directions, disposed in both end areas of each tensioning piston 12.

Figure 2:
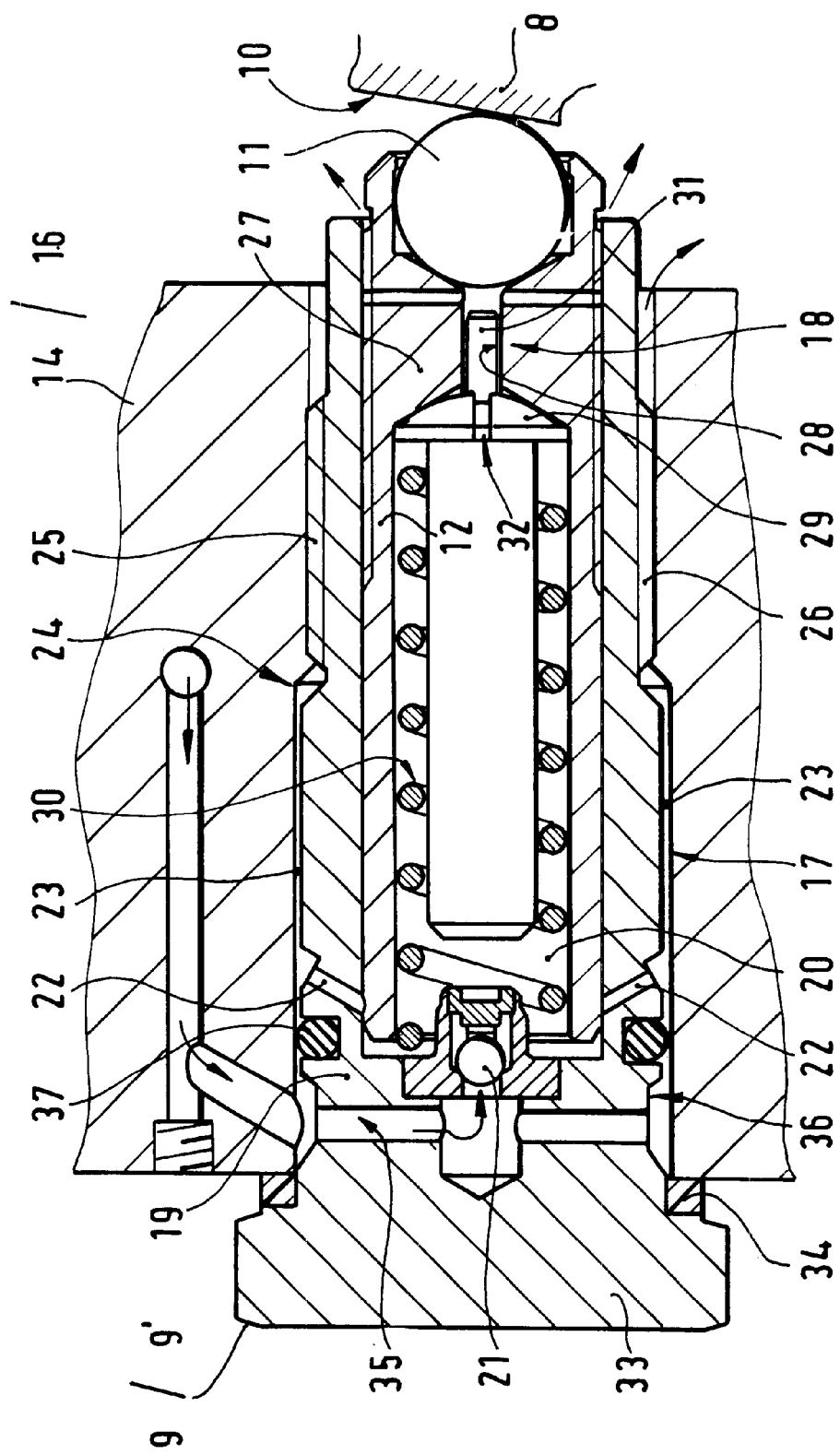
FIG. 2 is an enlarged longitudinal sectional view of a chain tensioner assembly constructed according to preferred embodiments of the invention.

As also indicated in detail in FIG. 2, each tensioning piston 12 of the chain tensioners 9, 9' is inserted in a spring-loaded slidable manner in a hollow screw-in part 19 and bounds a hydraulic pressure chamber 20 to which a hydraulic medium is fed on the face by way of a return valve 21. For a first damping leakage 17 used for venting in the case of the vertically aligned first chain tensioner 9, an essentially radial channel 22 in the screw-in part 19 and an adjoining circumferential gap 23 between the screw-in part 19 and a cylinder-head-side screw-in bore 24 as well as an adjoining, penetrably designed screwed thread-type connection 25 are provided. For a better penetrability of the screwed thread-type connection 25, the latter can be constructed with a narrow groove 26.

For a second damping leakage 18 used for the venting in the case of the chain tensioner 9' extending horizontally, a drainage channel 28, which is throttled to the amount of the leakage, is provided in a piston bottom 27 of the hollow tensioning piston 12 which carries the spherically designed end section 11.

In addition, at a normal chain tension, both damping leakages 17 and 18 of each chain tensioner 9, 9' can cause a parallel damping, as known, for example, per se from German Patent Document DE 40 35 823 C1.

Furthermore, it is illustrated particularly in FIG. 2 that, on the interior side of the hollow tensioning piston 12, the piston bottom 27 has a conical design for the joining of a supporting disk 29 constructed in a crowned or conical shape, against which a pressure spring 30 arranged in the tensioning piston 12 and supported against the screw-in part 19 on the return valve side rests on the one side and on which a throttle pin 31 is arranged on the other side which throttles the drainage channel 28 in the piston bottom 27, the supporting disk 29 having overflow grooves 32 directed to the drainage channel 28.

Finally, each screw-in part 19 of the chain tensioners 9, 9', which can be mounted from the outside, comprises a screw head 33 with a sealing ring 34 which, on one side, seals off a circumferential groove 36 which is used for the inflow of hydraulic medium from the respective cylinder head 14, 16 to the valve-controlled pressure chamber 20, which is connected with overflow channels 35 and is sealed off with respect to the circumferential gap 23 of the first damping leakage 17 by of an O-ring 37.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Chain drive of a V-engine having overhead camshafts which are driven by a crankshaft and each of the camshafts by a separate chain, in which tensioner blades swivellably assigned to a respective slack run of the separate chain are acted upon by hydraulic chain tensioners, the hydraulic chain tensioners are of the same construction, wherein the tensioner blades have in free end areas contact ramps for spherically shaped end sections on tensioning pistons of the chain tensioners, said contact ramps being arranged in a sloped manner such that the first chain tensioner is arranged in an area of an inlet-side longitudinal side of a first cylinder head, and the second chain tensioner is arranged in an area of an outlet-side longitudinal side of a second cylinder head, wherein the chain tensioners are arranged substantially transverse to one another with the first chain tensioner vertically aligned to vertically sloped and the second chain tensioner horizontally aligned to horizontally sloped, wherein each said chain tensioner is equipped with leakage devices in both end areas of the tensioning pistons, said leakage devices being operable for accommodating different venting directions.

2. Chain drive according to claim 1, wherein each said tensioning piston of the chain tensioners is inserted in a spring-loaded slidable manner in a hollow screw-in part and bounds a hydraulic pressure chamber to which a hydraulic medium is fed on a face by a return valve, a first damping leakage device includes a substantially radial channel in the screw-in part and an adjoining circumferential gap between the screw-in part and a cylinder-head-side screw-in bore as well as an adjoining, penetrably designed screwed thread-type connection, a second damping leakage device includes a drainage channel, throttled to an amount of the leakage, in a piston bottom of the hollow tensioning piston in the area of the spherically shaped end section, and each of the damping leakage devices corresponding to the installed position of the respective chain tensioner being simultaneously used for system venting.

3. Chain drive according to claim 2, wherein on an interior side of the hollow tensioning piston, the piston bottom has a conical shape for joining a supporting disk with a crowned or conical shape, against which a pressure spring arranged in the tensioning piston and supported against the screw-in part on the return valve side, rests on a first side of the supporting disk, and on which a throttle pin is arranged on a second side of the supporting disk which throttles the drainage channel in the piston bottom, the supporting disk having overflow grooves directed to the drainage channel.

4. Chain tensioner according to claim 2, wherein each of the screw-in parts of the chain Tensioners is mountable from outside and comprises a screw head with a sealing ring, whereby a circumferential groove is used for an inflow of hydraulic medium from the respective cylinder head to the hydraulic pressure chamber, said hydraulic pressure chamber being valve controlled, and said circumferential groove being connected with overflow channels and sealed off from the circumferential gap of the first damping leakage device by an O-ring.

5. A hydraulic chain tensioner for a chain drive of an engine acting upon a tensioner blade swivellably assigned to a slackrun of a chain, wherein the tensioner blade has in a free end area a contact ramp for a spherically shaped end section on a tensioning piston of the chain tensioner, said chain tensioner being equipped with leakage devices in both ends of the tensioning piston for venting when positioned in respective different angular orientation positions in use on an engine.

6. Hydraulic chain tensioner according to claim 5, wherein said tensioning piston of the chain tensioner is inserted in a spring-loaded slidable manner in a hollow screw-in part and bounds a hydraulic pressure chamber to which a hydraulic medium is fed on a face by a return valve, wherein said tension piston includes a first damping leakage device including a substantially radial channel in the screw-in part and an adjoining circumferential gap between the screw-in part and a cylinder-head-side screw-in bore as well as an adjoining, penetrably designed screwed thread-type connection.

wherein said tensioning piston includes a second damping leakage device including a drainage channel, throttled to an amount of leakage, in a piston bottom of the hollow tensioning piston in an area of the spherically shaped end section, and wherein each of the damping leakage devices, corresponding to the installed position of the chain tensioner, being simultaneously used for system venting.

7. Method of making a chain drive of an engine having overhead camshafts, which are driven by a crankshaft and each of the cam shafts by a separate chain, comprising the acts of;

providing tensioner blades swivellably assigned to a respective slackrun of each of the separate chains, providing hydraulic chain tensioners, each of which are of the same construction, for acting upon the tensioner blades, arranging a first of the chain tensioners in an area of an inlet-side longitudinal side of a first cylinder head, and arranging a second of the chain tensioners in an area of an outlet-side longitudinal side of a second cylinder head, wherein the tensioner blades have in free end areas contact ramps of spherically shaped end sections on tensioning pistons of the chain tensioners, said contact ramps being arranged in a sloped manner, and wherein the chain tensioners are substantially transverse to one another with the first chain tensioner vertically aligned to vertically sloped and the second chain tensioner horizontal aligned to horizontal sloped, and each said chain tensioner is equipped with leakage devices, used for venting in different directions, in both end areas of the tensioning piston.

* * * * *